Dec. 13, 1966 K. E. WOOD 3,292,150

MAXIMUM VOLTAGE SELECTOR

Filed April 23, 1963 2 Sheets-Sheet 1

INVENTOR.
KENNETH E. WOOD

BY

ATTORNEYS

MAXIMUM VOLTAGE SELECTOR

Filed April 23, 1963 2 Sheets-Sheet 2

INVENTOR.
KENNETH E. WOOD
BY
ATTORNEYS

United States Patent Office 3,292,150

Patented Dec. 13, 1966

3,292,150

MAXIMUM VOLTAGE SELECTOR

Kenneth E. Wood, Severna Park, Md., assignor, by mesne assignments, to the United States of America as represented by the Secretary of the Navy Filed Apr. 23, 1963, Ser. No. 275,175
10 Claims. (Cl. 340—149)

The present invention relates to a maximum voltage selector and more particularly to a maximum voltage selector which is completely electronic in construction and has a binary output.

According to the invention, a plurality of analogue voltages, the maximum of which is desired to be selected, is coupled through a peak selector and also through a series of electronic switches into an inverter. The outputs of the peak selector and the inverter are coupled into a clocked comparator, which is then utilized as the drive for a binary counter and a recirculating shift register having the same number of stages as the number of input analogue voltages. The counter has the same number of possible conditions as the number of input analogue voltages. The electronic switches are sequentially activated which allows each input to be compared with the peak input in sequence. When there is a difference between a peak or maximum input and the particular input being compared with it, the comparator will yield an output which will advance the binary counter one count and advance a preset 1 state in the recirculating shift register one stage. The outputs from the shift register are then utilized to sequentially switch the various inputs to the inverter. Hence, when the two inputs to the comparator are equal i.e. the selected input to the inverter is the peak or maximum input, there will be no output from the comparator and the system will remain in a static state awaiting a change in the maximum input potential. The counter will then indicate which of the inputs is maximum.

It is thus an object of the present invention to provide a maximum analogue voltage selector which is fully automatic and utilizes no moving parts.

Another object is a provision of a maximum analogue selector in which the output is binary in nature.

A further object of the present invention is the provision of a maximum analogue voltage selector which utilizes standard electronic components.

Yet another object of the invention is to provide a maximum analogue voltage selector which is simple, inexpensive and requires a minimum of calibration and maintenance.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
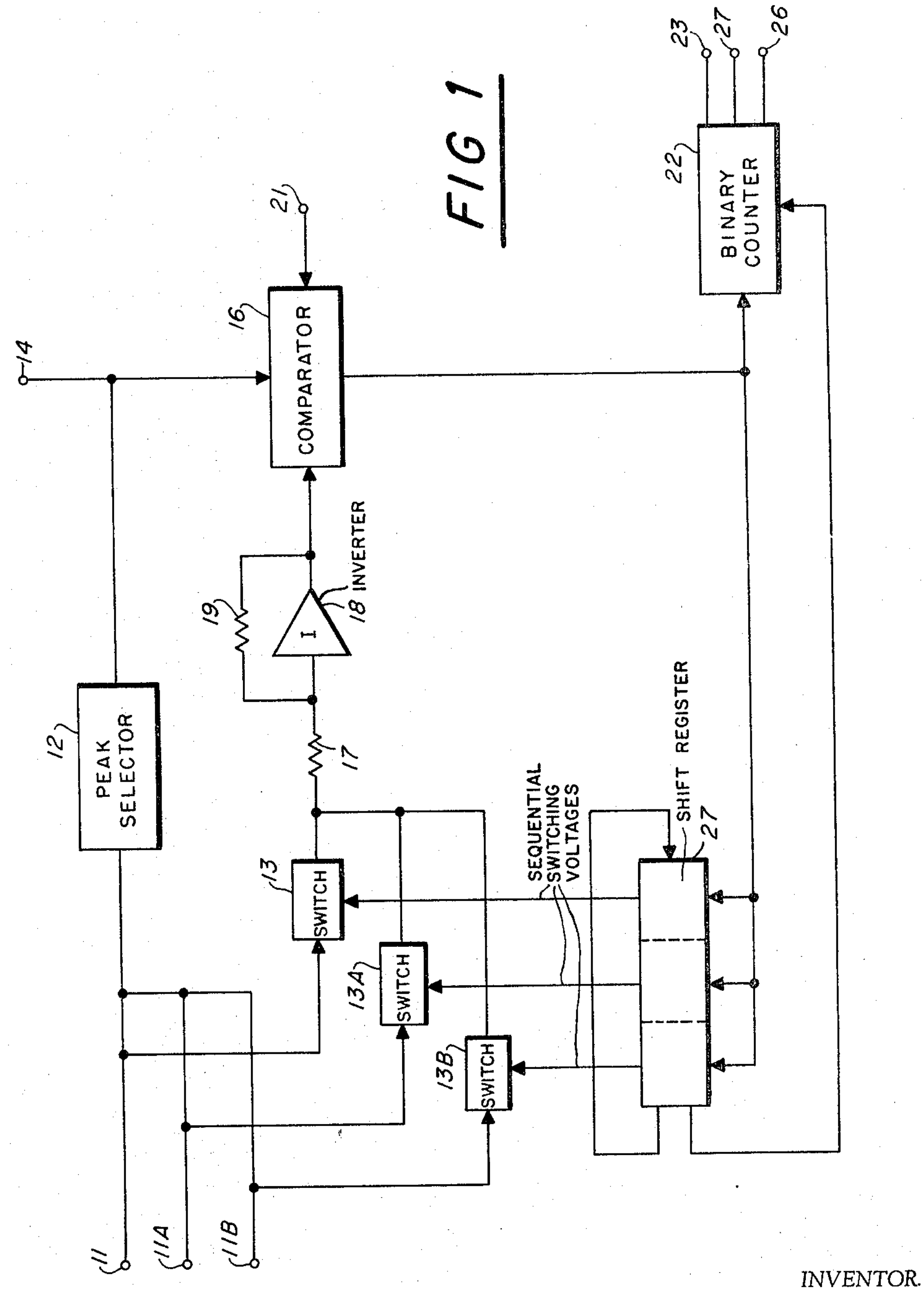
FIG. 1 is a block diagram of a preferred embodiment of the present invention.

Referring to FIG. 1 any number of input terminals, such as terminals 11, **11*a*, and 11*b*, are coupled to peak selector 12 and to switches 13, 13*a* and 13*b* respectively. The output of peak selector 12 is coupled to output terminal 14 and comparator 16. The outputs of switches 13, 13*a* and 13*b* are connected through isolating resistor 17 to inverter 18. Feedback resistor 19 is coupled between the input and output of inverter 18. The output of inverter 18 is also connected to an input of comparator 16. Terminal 21 is connected to another input of comparator 16. The output of comparator 16 is coupled to binary counter 22 having outputs 23, 24 and 26 and to recirculating shift register 27. The outputs of recirculating register 27 are coupled to switches 13, 13*a* and 13*b***.

Figure 2:
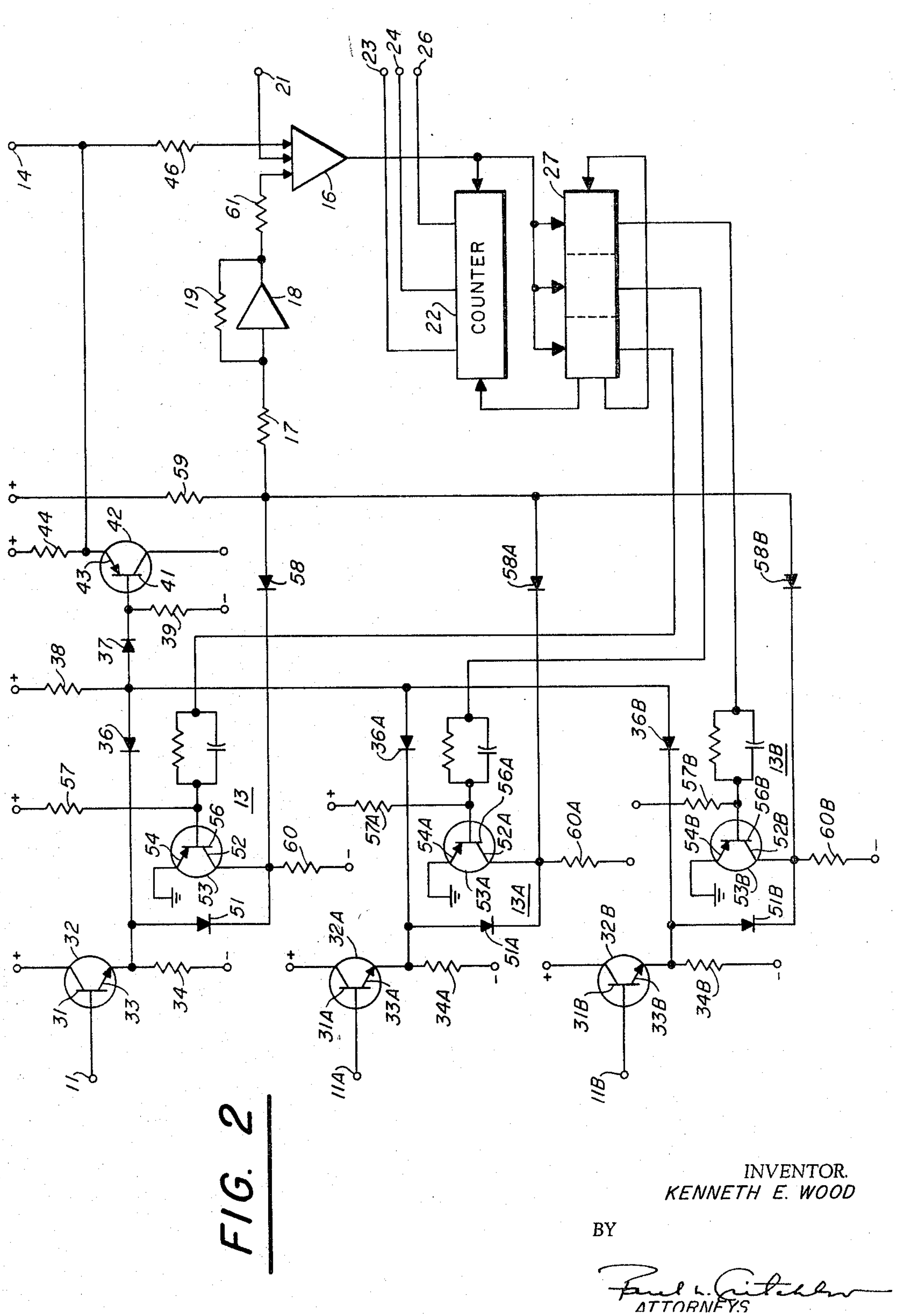
FIG. 2 is a schematic representation of the block diagram of FIG. 1.

Referring to FIG. 2, input terminals 11, **11*a* and 11*b* are shown connected to base elements 31, 31*a* and 31*b*, respectively, of transistors 32, 32*a* and 32*b*. Transistors 32, 32*a* and 32*b* all have collectors connected to the positive terminal of the power supply and emitters 33, 33*a* and 33*b*, respectively, coupled through resistances 34, 34*a* and 34*b*, respectively, to the negative terminal of the power supply. Emitters 33, 33*a* and 33*b* are coupled through diodes 36, 36*a* and 36*b* respectively to the junction of diode 37 and resistance 38. The other end of resistance 38 is coupled to the positive terminal of the power supply and the other side of diode 37 is connected through resistance 39 to the negative terminal of the power supply and to base 41 of transistor 42. Emitter 43 of transistor 42 is coupled to output terminal 14 and through resistance 44 to the positive terminal of the power supply and through isolation resistance 46 to one input of comparator 16**.

Emitters 33, **33*a* and 33*b* are also coupled through diodes 51, 51*a* and 51*b* to collectors 52, 52*a* and 52*b*, respectively, of transistors 53, 53*a* and 53*b*, respectively. Each of transistors 53, 53*a* and 53*b* have emitters 54, 54*a* and 54*b* connected to ground. Bases 56, 56*a* and 56*b* of transistors 53, 53*a* and 53*b*, respectively, are connected through resistors 57, 57*a* and 57*b* to the positive terminal power supply. Collectors 52, 52*a* and 52*b* of transistors 53, 53*a* and 53*b*, respectively, are connected through resistors 60, 60*a* and 60*b*, respectively, to the negative terminal of the power supply and through diodes 58, 58*a* and 58*b*, respectively, to the junction of isolating resistor 17 and resistance 59. The other end of resistance 39 is tied to the positive terminal of the power supply and the other end of resistance 17 is connected to the input of comparator 18. The output of comparator 18 is connected through adding resistance 61 to an input of comparator 16**.

*Operation*

Referring back to FIG. 1, assume three distinct analogue potentials coupled to input terminals 11, **11*a* and 11*b*. These potentials are coupled into peak selector 12 which selects the highest of the three potentials which it then yields at output terminal 14, and presents to one input of comparator 16. These three potentials are each connected sequentially through an electronic switch 13, 13*a* and 13*b* the outputs of which are inverted in inverter 18 and presented to comparator 16 for comparison with the output of peak selector 12. At any one time only one potential is present at the input of inverter 18 and, hence, one potential compared with the output of peak selector 12. Assuming that the potential being compared with the output of peak selector 12 which is not the maximum analogue voltage present at input terminals 11, 11*a* and 11*b*, comparator 16 will yield an output when clocked by a clock pulse presented at terminal 21. This clock pulse is then presented to binary counter 22, which registers it as a one count and also utilized to shift recirculating shift register 27. Recirculating shift register 27 has a built-in 1 state which is shifted along its three stages with each signal output from comparator 16. The stage at which the 1 is present will in turn yield an output to either switch 13, 13*a* or 13*b* allowing the input potential at terminal 11, 11*a* or 11*b* to pass through inverter 18 and be compared with the output of peak selector 12. At this time if there is still a difference, the next clock pulse presented at terminal 21 will cause comparator 16 to yield an output registering another binary count at counter 22, and shifting the 1 to the next stage of recirculating shift register 27, which in turn turns its corresponding switch on and the previous corresponding switch off, allowing the next voltage to be compared in comparator 16. This process continues until the potential selected by switches by 13, 13***a* or 13*b* is the peak or maximum potential presented at the input terminals. At this time there will be no difference in potential at the input terminals of comparator 16 i.e. the algebraic edition will equal 0, and comparator 16 will not yield an output when a clock pulse is presented at terminal 21. The system will remain at rest until such time as a different input terminal receives the peak voltage. The analogue peak voltage output can be taken at terminal 14, and the binary count indicating which input terminal has the maximum analogue voltage is taken at output terminals 23, 24 and 26.

Referring now to FIG. 2 peak selector 12 of FIG. 1 is shown as transistor 32, 32*a* and 32*b* together with transistor 42 and diodes 36, 36*a*, 36*b* and 37 and their associated circuitry. Transistors 32, 32*a* and 32*b* each have their bases connected to one of the input terminals and each operate as an emitter follower. Assuming all of the input voltages to be positive with respect to ground and ground potential to be between the negative and positive terminals of the power supply each emitter 33, 33*a* and 33*b* will then assume substantially the same potential as the input voltages. The most negative of the input voltages will appear at the junction of diodes 36, 36*a*, 36*b* and diode 37 due to current flow through diodes 36, 36*a*, 36*b* and resistance 38 i.e. the bottom of resistance 38 will assume the potential of the most negative of the input potentials. This will cause the current through the other diodes to be cut off since their anodes will be more negative than their cathodes. Diode 37 is placed in the circuit to cancel out the resistance of diode 36 and is always conducting since the negative end of resistance 39 (tied to the negative power supply terminal) is always more negative than the input potential. Transistor 42 operates as another emitter follower which couples the output to output terminal 14 and to one input of comparator 16. The negative bias of the high-signal emitter follower 32 will also have the effect of back biasing and canceling out any voltage drop in the remaining input emitter followers since they are of opposite conductivity type.

Each emitter of the input emitter followers also couple an input voltage through a diode (diodes 51, 51*a* and 51*b*) to the collector of a switching transistor (transistors 53, 53*a* and 53*b*). All of the switching transistors with the exception of one will be conducting (those associated with the shift register stages in the 0 state), the one being cut off having its base connected to the stage which is in the 1 state. The collectors of the transistors that are conducting will be at substantially ground potential, cutting off the coupling diode which couples the output of the input emitter followers to the collector of the switching transistors. This is due to the fact that the cathode of the coupling diode (diodes 51, 51*a* or 51*b*) will be more positive than their anodes rendering them non-conductive and also rendering diodes 58, 58*a* or 58*b* non-conductive for the same reason. Hence, at any one time only one input analogue potential will be passed from its input emitter follower (32, 32*a* or 32*b*) through the two series diodes (51*a* and 58*a*, or 51*b* and 58*b*) to the input of inverter 18.

As previously explained, inverter 18 reverses the polarity of its input and presents one input signal at a time to an input of comparator 16 which is added algebraically with the output of emitter follower 42. When the next clock pulse appears at terminal 21 this difference, if any, between the two input signals at the inputs of comparator 16 will appear as a shift pulse to recirculating shift register 27, which will render non-conducting the next switching transistor 53 through 53*b*. This in turn will permit the anode of diode 37 to fall to a new negative voltage if the unknown voltage applied to said switch transistor is the maximum. If it is not, then the associated diode 58 through 58*b* will be non-conducting by a reverse voltage equal to the amplitude difference between the selected voltage and the maximum voltage. This process continues until the algebraic input to the comparator becomes zero. The counter stops. The output of the counter is then the binary value assigned to the input line, i.e., it will indicate binary 010, if the maximum input signal is on line 2.

Thus, a maximum analogue voltage selector and counter has been disclosed which is entirely electronic in operation and requires no moving parts at a minimum of calibration and maintenance. It should be understood, of course, that the foregoing disclosure relates to only a preferred embodiment of the invention and that it is intended to cover all changes and modifications which the the example of the invention herein shows and for the purposes of the disclosure which do not constitute departure from the spirit and scope of the invention.

What is claimed is:

1. A peak analogue voltage selector comprising:
maximum voltage selecting means having an input adapted for connection to a plurality of analogue voltages of interest;
a plurality of electronic switching means each having an input adapted for connection to a different one of said plurality of analogue voltages;
voltage comparator means having one input connected to an output of said maximum voltage selecting means and having a second input connected to the outputs of said plurality of switching means;
readout means for periodically reading out any difference of voltage between said inputs of said comparator;
counting means operably connected to said comparator for counting any output pulses thereof; and
control means operably connected to said plurality of switching means for sequentially switching said plurality of switching means.

2. The peak analogue voltage selector of claim 1 wherein said control means comprises a re-circulating shift register.

3. The peak analogue voltage selector of claim 2 wherein said shift register has a shift pulse line operably connected to said comparator for shifting said shift register in accordance with any output pulses of said comparator.

4. The peak analogue voltage selector of claim 1 wherein said counting means comprises a binary counter.

5. A peak analogue voltage selector comprising:
maximum voltage selecting means having an input adapted for connection to a plurality of analogue voltages of interest;
a plurality of electronic switching means each having an input adapted for connection to a different one of said plurality of analogue voltages;
voltage comparator means having one input connected to an output of said maximum voltage selecting means and having a second input connected to the outputs of said plurality of switching means;
readout means for periodically reading out any difference of voltage between said inputs of said comparator.

6. A peak analogue voltage selector comprising:
maximum voltage selecting means having an input adapted for connection to a plurality of analogue voltages of interest;
a plurality of electronic switching means each having an input adapted for connection to a different one of said plurality of analogue voltages;
voltage comparator means having one input connected to an output of said maximum voltage selecting means and having a second input connected to the outputs of said plurality of switching means;
readout means for periodically reading out any difference of voltage between said inputs of said comparator;

control means operably connected to said plurality of switching means for sequentially switching said plurality of switching means.

7. The peak analogue voltage selector of claim 6 wherein said control means comprises a re-circulating shift register.

8. The peak analogue voltage selector of claim 7 wherein said shift register has a shift pulse line operably connected to said comparator for shifting said shift register in accordance with any output pulses of said comparator.

9. A peak analogue voltage selector comprising:

maximum voltage selecting means having an input adapted for connection to a plurality of analogue voltages of interest;

a plurality of electronic switching means each having an input adapted for connection to a different one of said plurality of analogue voltages;

voltage comparator means having one input connected to an output of said maximum voltage selecting means and having a second input connected to the outputs of said plurality of switching means;

readout means for periodically reading out any difference of voltage between said inputs of said comparator;

counting means operably connected to said comparator for counting any output pulses thereof.

10. The peak analogue voltage selector of claim 9 wherein said counting means comprises a binary counter.

References Cited by the Examiner

UNITED STATES PATENTS

| | | | |
|---|---|---|---|
| 2,784,396 | 3/1957 | Kaiser et al. | 340—149 X |
| 3,168,722 | 2/1965 | Sanders | 340—172 |
| 3,189,875 | 6/1965 | Hendrickson et al. | 340—149 X |

NEIL C. READ, *Primary Examiner.*

D. YUSKO, *Assistant Examiner.*